United States Patent
Borowsky et al.

(10) Patent No.: US 6,381,619 B1
(45) Date of Patent: Apr. 30, 2002

(54) COMPUTER DATA STORAGE SYSTEM WITH MIGRATION PLAN GENERATOR

(75) Inventors: Elizabeth Lynn Borowsky, Brookline, MA (US); Richard Andrew Golding, San Francisco, CA (US); Dushyanth Narayanan, Pittsburgh, PA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/394,221

(22) Filed: Sep. 13, 1999

(51) Int. Cl.[7] .............................................. G06F 17/30
(52) U.S. Cl. ..................... 707/204; 707/201; 707/202; 707/203; 707/200; 707/205; 707/10; 711/170; 711/171; 711/172; 711/173
(58) Field of Search ................................ 707/200–205, 707/10; 711/170, 173

(56) References Cited

U.S. PATENT DOCUMENTS

| | | | | |
|---|---|---|---|---|
| 5,146,561 A | * | 9/1992 | Carey et al. ................. 707/203 |
| 5,894,560 A | * | 4/1999 | Carmichael et al. ......... 707/204 |
| 5,896,548 A | * | 4/1999 | Ofek ........................... 707/204 |
| 6,070,172 A | * | 5/2000 | Lowe .......................... 707/205 |
| 6,272,605 B1 | * | 8/2001 | Le et al. ...................... 711/151 |
| 6,279,074 B1 | * | 8/2001 | Pence .......................... 711/112 |

* cited by examiner

Primary Examiner—Kim Vu
Assistant Examiner—Cam-Y Truong

(57) ABSTRACT

A data storage system is provided in which a migration plan generates migration plans for reaching a goal configuration from an initial configuration in a predetermined period of time. The migration plan initially makes terminal moves until no further terminal moves can be made. A shunt move is then made based on reducing the contention (the total size of the data stores that need to be moved onto a particular data stores device divided by the amount of excess capacity on the data storage device). The shunt is selected to lead to the lowest contention for the data storage system. Subsequently, the migration plan returns to making terminal moves to develop a migration plan. Further migration plans are provided.

22 Claims, 5 Drawing Sheets

COMPUTER DATA STORAGE SYSTEM WITH MIGRATION PLAN GENERATOR

CROSS-REFERENCE TO RELATED APPLICATION(S)

The present application contains subject matter related to a concurrently filed U.S. Patent Application by Elizabeth L. Borowsky, Richard A. Golding, and Dushyanth Narayanan entitled "COMPUTER DATA STORAGE SYSTEM WITH PARALLELIZATION MIGRATION PLAN GENERATOR". This related application Ser. No. 09/494,646 is being filed contemporaneously herewith, and is hereby incorporated by reference.

TECHNICAL FIELD

The present invention relates generally to computer data storage systems and more particularly to systems for reconfiguration of data storage.

BACKGROUND

Computer data systems today are huge and complex. Examples are: data related banking records, the internet, data mining systems, libraries, and scientific applications like planning for weather forecasting. All of this data is now being stored on-line so that the data can be manipulated.

One major problem is efficient access to this stored data. An analogy would be data storage as a library, with the data as the books in the library, and the data storage devices as shelves for the books. Different data storage devices hold different blocks of data, just as in a library where different shelves hold different books. It is desired that data be arranged on storage devices, as books are arranged on shelves, for the most efficient access.

From a library perspective, it is most efficient for storage of all of the most frequently read books to be stored on one shelf. However, this is not the most efficient from a user perspective because all the users would be trying to access that one shelf. The same is true for data storage. If all of the most frequently used data is on one data storage device, it creates a bottleneck on the data storage device because it is possible to retrieve only a certain amount of data from a data storage device pier unit of time. Thus, a way to configure data storage to optimize throughput of the data storage system is necessary.

However, it is difficult to determine optimum data storage system configurations. It is necessary to look at workload patterns, how data is accessed, and what is important to the user. There are thousands, if not millions of blocks of data which must be considered.

There are individuals employed in many companies who regularly reconfigure the data storage in the data storage systems, and this is currently all being done manually. At the present time, the experts try and partition the problem into easy pieces. The people who do this are highly skilled and rely primarily on past experience, but there is no formalism to the reconfiguration process. Thus, a long sought, but unattained, objective in the field of data storage is to formalize the process and to make it easy, quantifiable, and quick to optimize a data storage system.

However, even if it were possible to optimize each storage system, even automatically, the problem is that workloads change. Over time, the most frequently used data changes. There are different blocks of data in the storage system. The access patterns to these blocks of data changes over time. Further, devices may fail or be added or subtracted. Thus, the ultimate goal is a data storage system which is not only able to automatically configure itself, but to reconfigure itself 'on-the-fly'; i.e. move stored data around based on changing access patterns.

Currently, it is necessary to take the whole data storage system down off-line, reconfigure it, and then bring it back up. This is an increasing problem because customers cannot really afford to take their systems down at all. For example, a bank needs to have its automated teller machine systems available twenty-four hours a day, seven days a week, fifty-two weeks a year.

In the past, it has been a major set of goals to automatically optimize data storage configurations and change data storage configurations during data system operation.

DISCLOSURE OF THE INVENTION

The present invention provides a computer data storage system with a migration plan generator which includes a "Simple" migration planner which provides for making terminal moves until no further terminal moves are possible based on random, preset, or functional ordering.

The present invention further provides a computer data storage system with migration plan generator which includes a "Simple" migration planner which provides for making terminal moves until no further terminal moves are possible, then making "shunt" moves, or non-terminal moves, until further terminal moves can be made.

The present invention further provides a computer data storage system with a migration plan generator which includes a "Greedy" migration planner which uses a "contention" metric. The "contention" of a data storage device is defined as the total size of the data stores that need to move onto such data storage device, divided by the amount of free space on such data storage device. The contention of the entire system is the sum of the contention over all the data storage devices. The migration plan generator develops a plan that leads to the lowest contention for the system.

The present invention further provides a computer data storage system with a migration plan generator which includes a "Cycle" migration planner which finds shunts by first trying to find cycles with small data stores in a Greedy fashion. Once the smallest data store is moved off a data storage device, the largest data store in the cycle is shunted to any data storage device that can accommodate it.

The present invention further provides a computer data storage system with a migration plan generator which includes a "Hillclimbing" migration planner which uses a global contention metric which seeks the closest local minimum for the contention metric.

The present invention further provides a computer data storage system with a migration plan generator which includes a "Simulated Annealing" migration planner which uses a probabilistic Hillclimbing approach that will sometimes choose moves that do not improve the optimization metric.

The present invention further provides a computer data storage system with a migration plan generator which includes a "Meta" migration planner which shifts from one planner to another based on the planner's performance.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
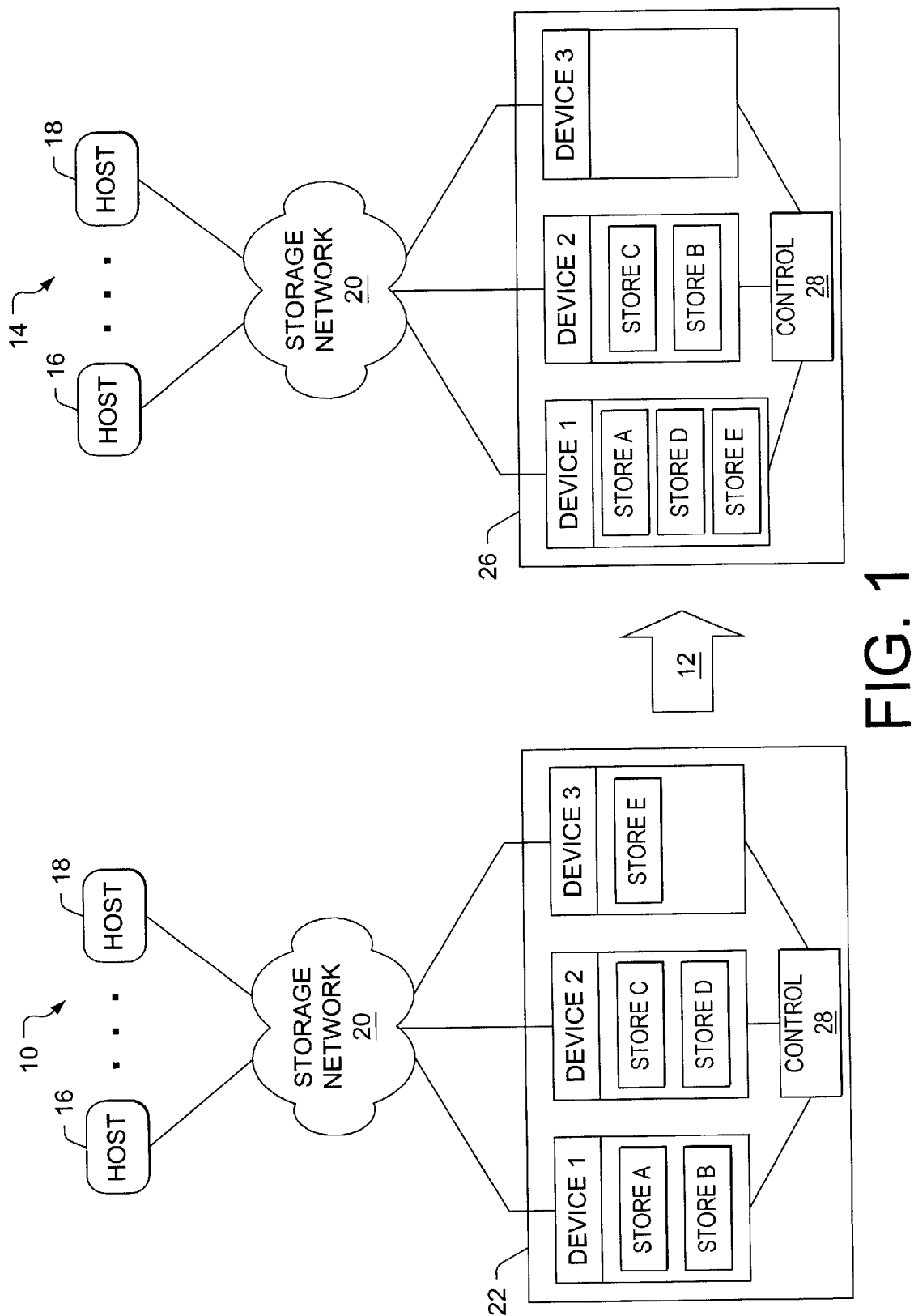
FIG. 1 is an overview illustration of the data system of the present invention and its migration from an initial to a goal configuration.

Referring now to FIG. 1, therein is shown an initial configuration data system 10 migrating through the migration 12 to become a goal configuration data system 14.

The initial and goal configuration data Systems 10 and 14 have a plurality of hosts 16 through 18 which are devices or systems such as computers, terminals, user devices, etc. which run different types of computer applications and access different blocks of data.

The plurality of hosts 16 through 18 are connected to a storage network 20, which could be a local area network, a wide area network, the Internet, or any other communication network.

The storage network 20 in turn is connected before the migration 12 to an initial configuration data storage system, or initial configuration system 22, and after migration 12 to a goal configuration data storage system, or goal configuration system 26.

Both the initial and goal configuration Systems 22 and 26 have a plurality of data storage systems which are exemplified by the data storage devices designated as device 1, device 2, and device 3. The devices 1, 2, and 3 could be disks, disk drives, disk arrays, tape drives, or other data storage mechanisms. The devices 1, 2, and 3 have various blocks of data, in data stores, assigned to them designated as store A through store E. The assignment of the stores A through E to devices 1 through 3 is called a configuration.

In the initial configuration system 22, the initial configuration has device 1 with store A and store B assigned to it, device 2 with store C and store D assigned to it, and device 3 with store E assigned to it.

In the goal configuration system 26, the goal configuration has device 1 with store A, store D, and store E assigned to it, device 2 with store C and store B assigned to it, and device 3 with no data block assigned to it.

The data stores are moved, or migrated, among the storage devices under the direction of a control 28 such as a computer, processor, controller, etc.

Figure 2:
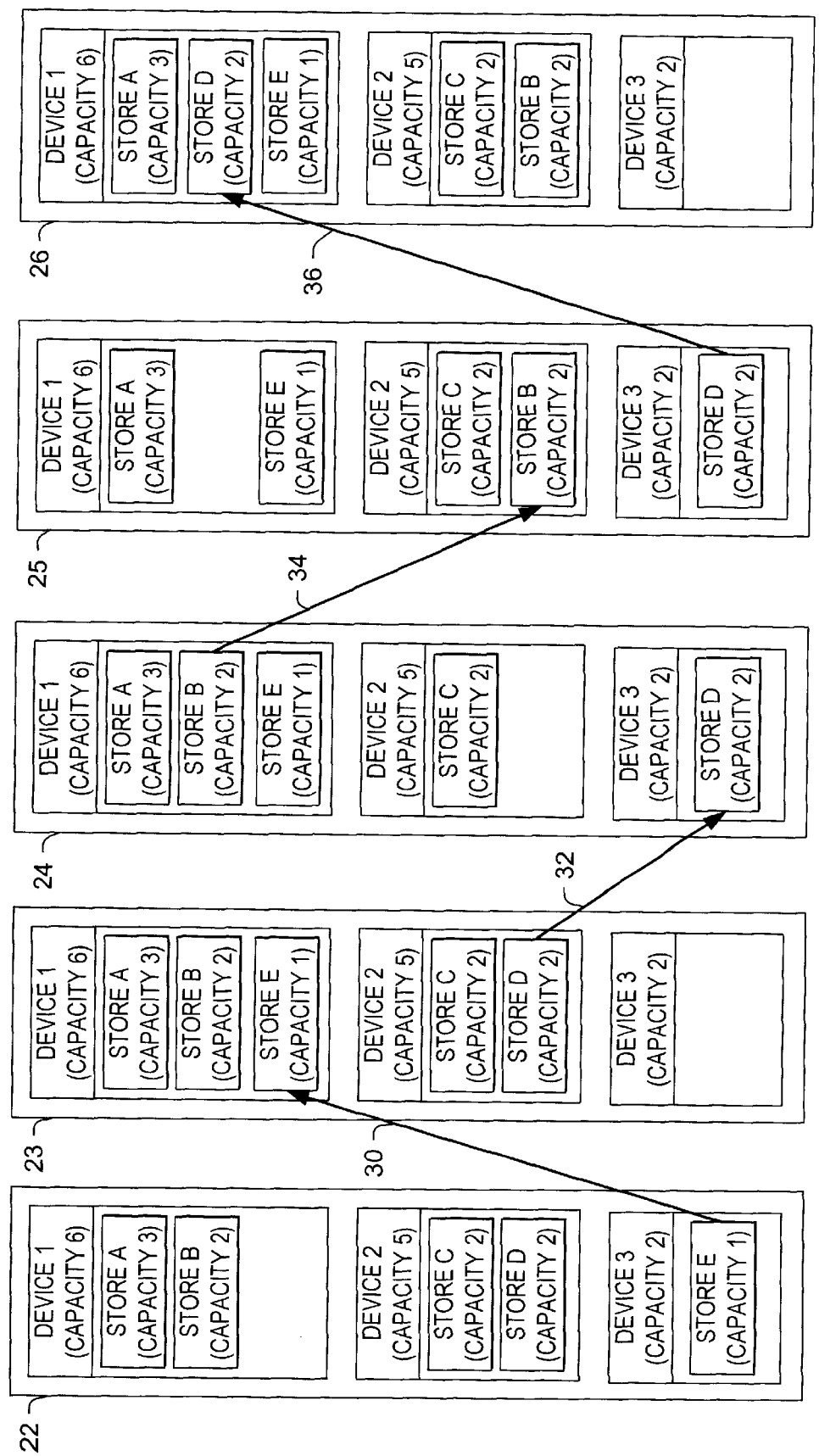
FIG. 2 is an exemplary migration plan used in the present invention.

Referring now to FIG. 2, therein is shown the initial configuration system 22, a first intermediate configuration system 23, a second intermediate configuration system 24, a third intermediate configuration system 25, and the goal configuration system 26.

In data storage systems, each data storage device has specific capacities, or limits, on the amount of data that can be stored. For exemplary purposes only, the devices 1 through 3 in FIG. 2 are shown in parenthesis having capacities of 6, 5, and 3, respectively. The capacity units could be megabytes, terabytes, etc., but this is not important for purposes of the example. Similarly, the various data stores, store A through store E have in parenthesis capacities of 3, 2, 2, 2, and 1, respectively. Again, the units are only important in that they match the capacity units of the devices 1 through 3.

Also shown in FIG. 2 is a plurality of data migrations or "moves" from one configuration into another. Arrows represent the "moves" of data stores among the data storage devices. A move 30 designates the migration of store E from device 3 to device 1. Move 32 designates the migration of store D from device 2 to device 3. Move 34 designates is the migration of store B from device 1 to device 2, and move 36 designates the migration of store D from device 3 to device 1.

The move 30 between the initial configuration system 22 and the first intermediate configuration system 23 may also be described as a "terminal" move in that a data store is assigned to a data storage device where it belongs in the goal configuration, such as the goal configuration system 26 for store E.

The move 32 from the first intermediate configuration system 23 to the second intermediate configuration system 24 may be described as a "shunt" move. In a shunt move, a data store is moved from a data storage device that it is on to a data storage device that is not its goal as in interim move. Thus, in move 32, store D is first moved to device 3 from device 2. This permits store B through move 34 to make a terminal move to device 2. This in turn permits the move 36 of store D to make at terminal move to the goal configuration of device 1.

In FIG. 2, the moves 30, 32, 34, and 36 taken collectively in sequence are called the "migration plan".

Figure 3:
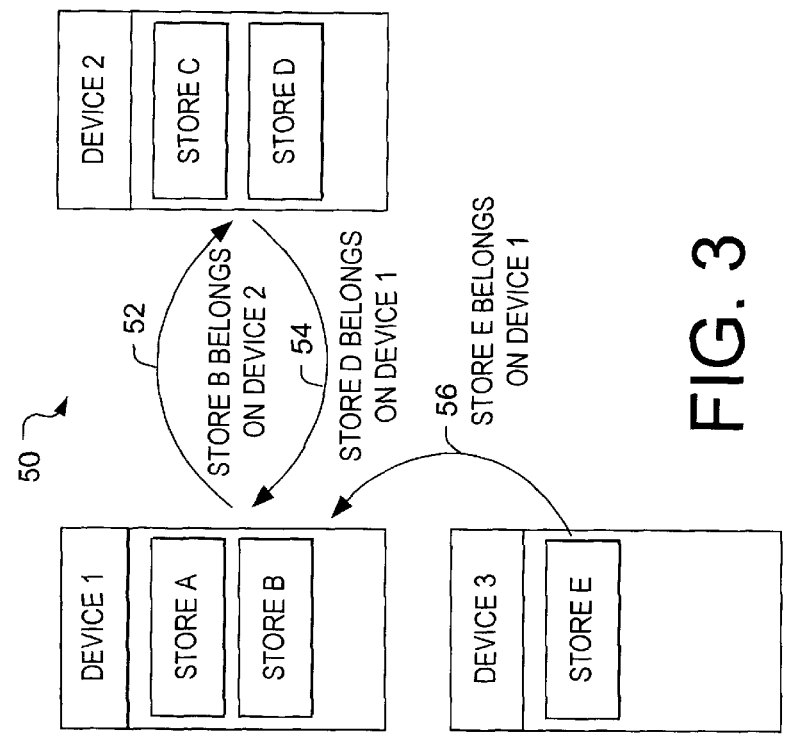
FIG. 3 is a terminal move graph of FIG. 2.

Referring now to FIG. 3, therein is shown a terminal move graph 50 which shows devices 1 through 3 in their initial configuration. The migration to the goal configuration is shown by an arrow representing a move 52 accompanied by a notation that store B belongs on device 2, by an arrow representing a move 54 accompanied by a notation that store D belongs on device 1, and an arrow representing a move 56 accompanied by a notation that store E belongs on device 1. It should be noted that the moves 52 and 54 of data stores exchanged between devices 1 and 2 are referred to as a "cycle".

Figure 4:
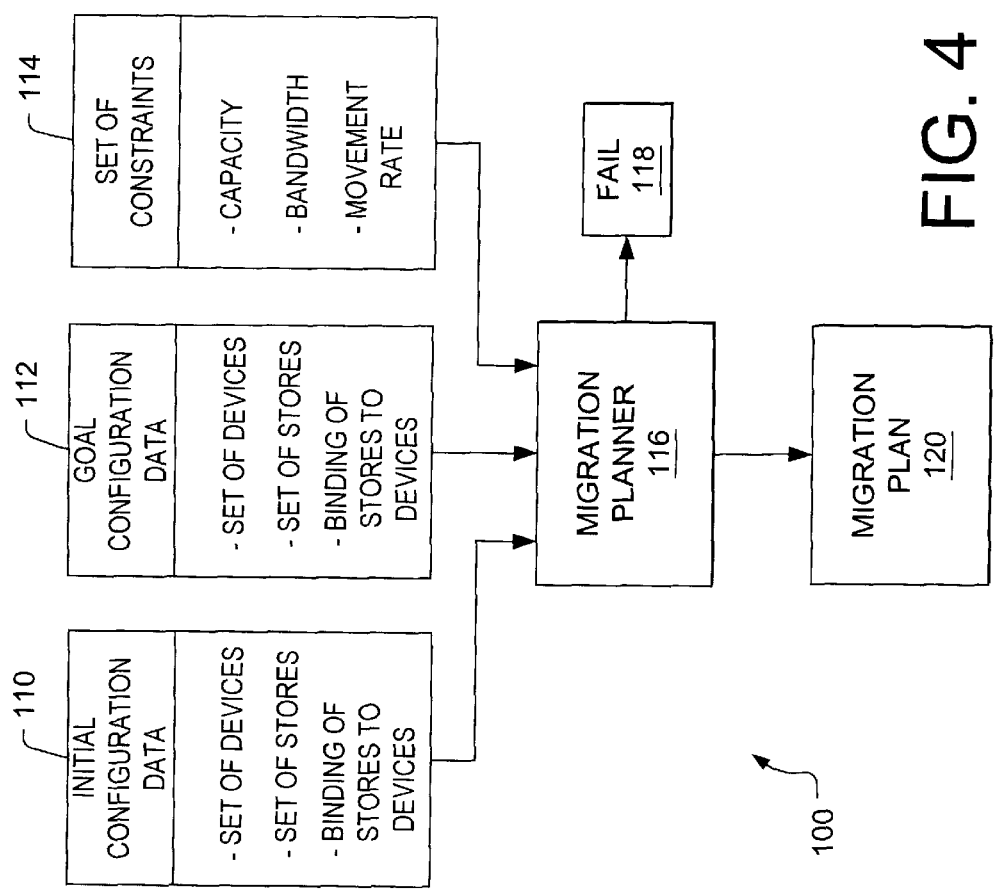
FIG. 4 is a migration plan generator used in the data system of the present invention.

Referring now to FIG. 4, therein is shown a migration plan generator 100. The migration plan generator 100 is connected to receive initial configuration data 110, goal configuration data 112, and a set of constraints 114 from the control 28.

The initial and goal configuration data 110 and 112 contain information on the initial and goal configuration systems 22 and 26, respectively. Such information would include the set of data storage devices in each, the set of data stores in each, and the assignments or "binding" of the data stores to the data storage devices. The set of constraints 114 contains the capacities of the data storage devices, the capacities of the data stores, the bandwidth, movement rate, and other limitations on the moves.

The set of constraints 114 prevents certain moves. For example, device 3 has a capacity of 2, so two data stores having a capacity of 2 each cannot be placed on it. If the data stores are to be accessed during the migration, there must be enough bandwidth for a host to access the data store on the data storage device where it resides. If the data storage device is already bottlenecked on bandwidth and the data store is moved to a very heavily used data storage device, it is desirable to move an existing data store off the destination data storage device before moving the new data store onto it so that the data store can be accessed once it gets to the data storage device.

Another constraint is movement rate. There may be timing restrictions. For example, the plan might have to be executed in one hour. With a very slow data storage device, like a tape drive, and a large data store that needs to be moved, it might not be feasible to move the data store onto and off the tape drive because that may take more time than the hour set for completing the plan.

In the migration plan generator 100, the initial configuration data 110, the goal configuration data 112, and the set of constraints 114 are provided to a migration planner 116. The migration planner 116 either fails to develop a migration plan and exits to "fail" block 118 or produces a viable migration plan 120 for implementation by the control 28.

Figure 5:
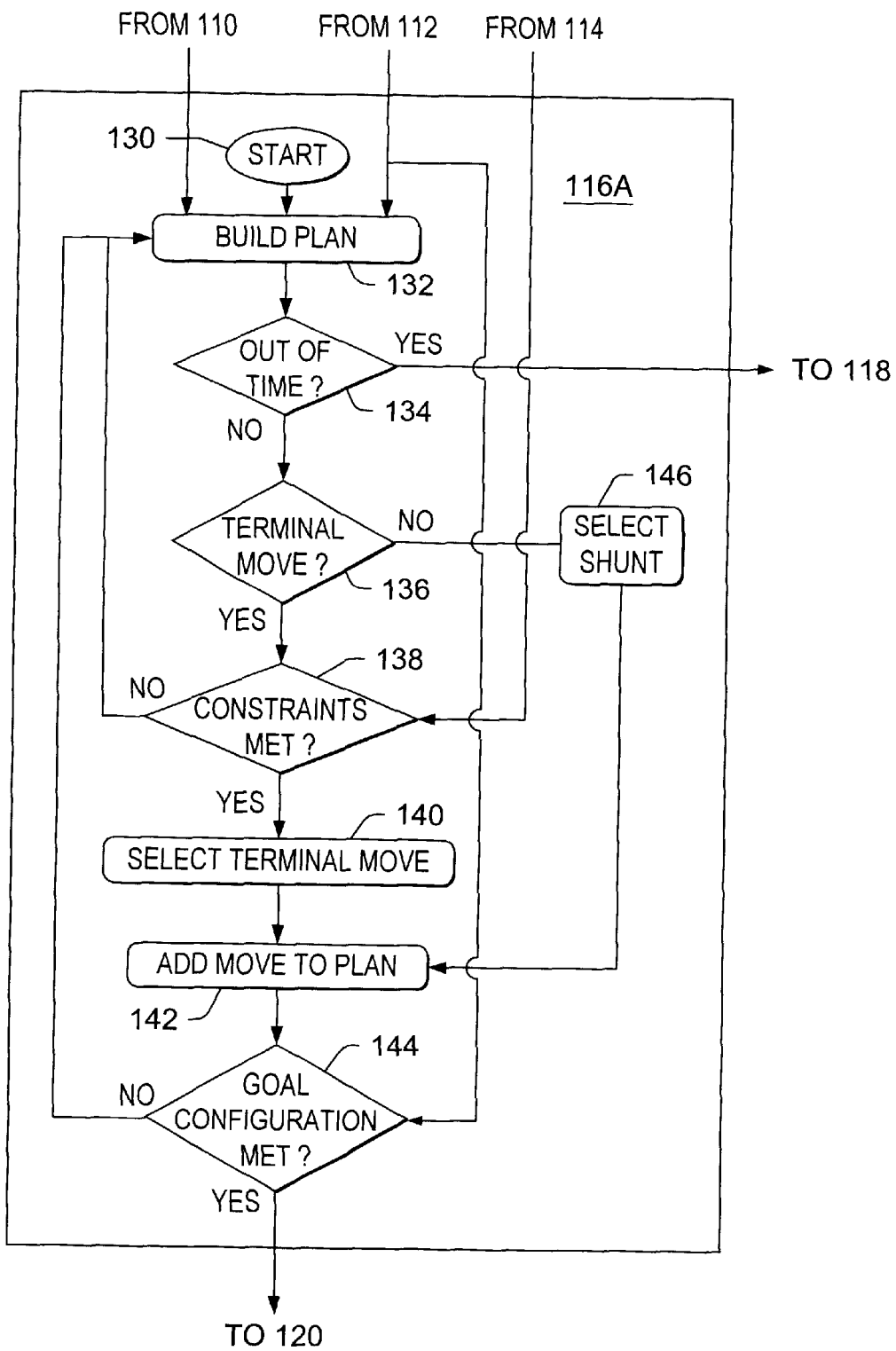
FIG. 5 is a migration planner used in the migration plan generator of FIG. 4.

Referring now to FIG. 5, therein is shown one embodiment of the migration planner 116 which is designated as migration planner 116A. The migration planner 116A is a program which begins at a "start" 130 and goes to "build plan" block 132. The "build plan" block 132 receives the initial and goal configuration data 110 and 112. The output of the "build plan" block 132 is provided to an "out of time?" decision block 134 which outputs to "fail" block 118 if the program takes longer than a predetermined time. If there is remaining time, the "out of time?" decision block 134 is output to the "terminal move?" decision block 136. If a terminal move is possible, the program proceeds to the "constraints met?" decision block 138. The "constraints met?" decision block 138 receives the set of constraints 114 to determine whether or not the constraints have been met. If they have not been met, the program returns to the "build plan" block 132. If the constraints have been met, the program proceeds to the "select terminal move" block 140.

Once a terminal move is selected, it is added to the plan in an "add move to plan" block 142. The configuration after the added move is compared with the goal configuration data 112 in a "goal configuration met?" decision block 144. If the goal configuration is not met, the program returns to the "build plan" block 132, and if it is, it exits as the migration plan 120.

Referring back to the "terminal move?" decision block 136, if no terminal move is possible, the program moves to a "select shunt" block 146 where a shunt move is selected and the program proceeds to the "add move to plan" block 142. From the "add move to plan" block 142 the program proceeds as previously described.

Figure 6:
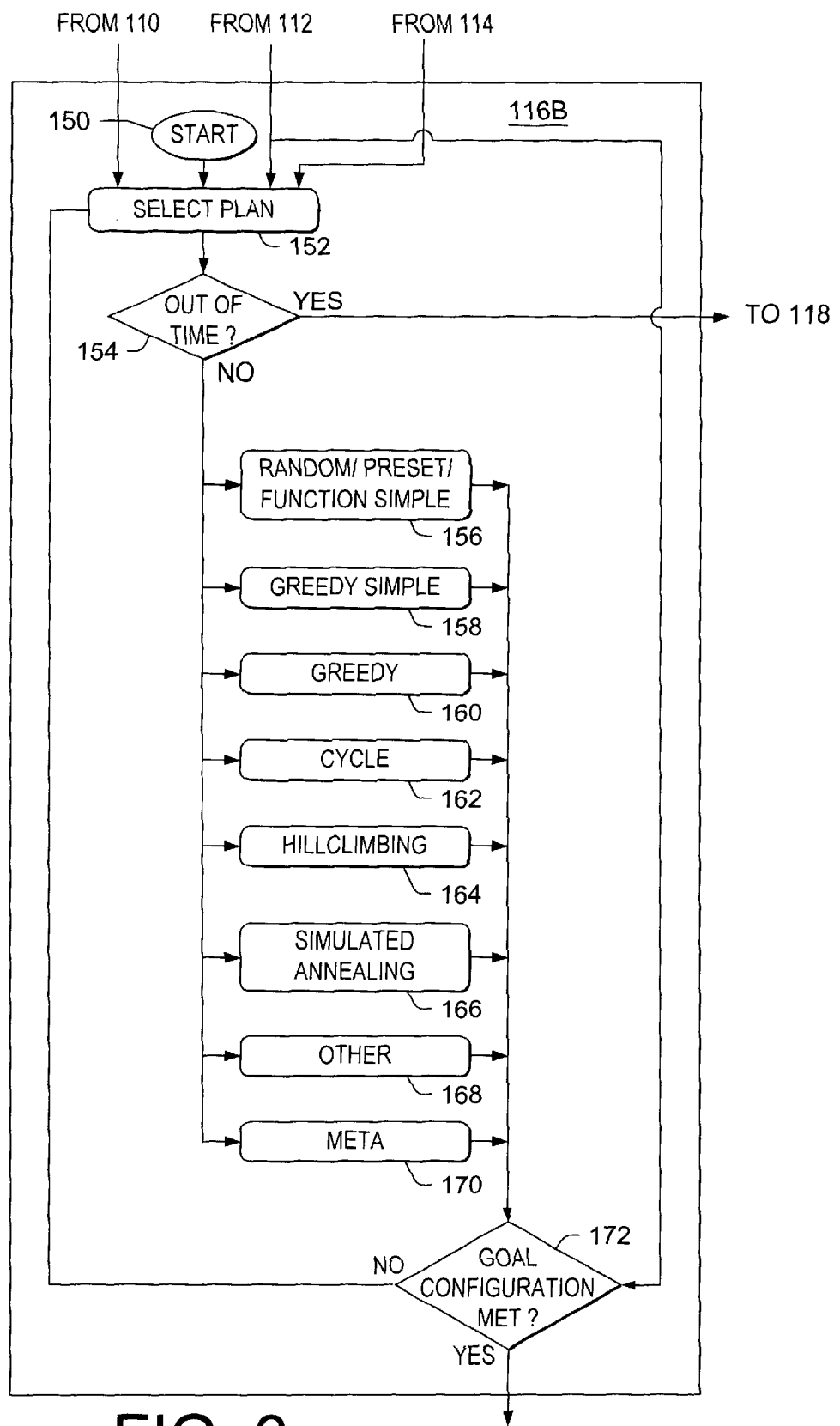
FIG. 6 is an alternative migration planner which could be used in the migration plan generator of FIG. 4.

Referring now to FIG. 6, therein is shown a migration planner 116B which is an alternative embodiment of the migration planner 116 in FIG. 4.

The migration planner 116B begins at a "start" block 150 and proceeds to a "select plan" block 152. The "select plan" block 152 receives the initial configuration data 110, the goal configuration data 112, and the set of constraints 114. The program proceeds from the "select plan" block 152 to an "out of time?" block 154 to determine if the plan has run out of time and if so, to proceed to the "fail" block 118. If there is time remaining, the program proceeds to a selected plan comprising: a "Random/Present/Function Sample" plan 156; a "Greedy Simple" plan 158; a "Greedy" plan 160; a "Cycle" plan 162; a "Hillclimbing" plan 164; a "Simulated Annealing" plan 166; an "Other" plan 168; or a "Meta" plan 170. After a program has processed the possible moves, the then current configuration is compared with the goal configuration in the "goal configuration met?" decision block 172. If the goal configuration has not been met, the program proceeds back to the "select plan" block 152 and, if it has it, exits as the migration plan 120.

In operation, the initial configuration data system 10 has the hosts 16 through 18 communicating over the storage network 20 to the initial configuration system 22. Then the initial configuration system 22 has devices 1 through 3 with the store A through store E bound as previously described. Over time, the initial binding of the data stores to the data storage devices may become less optimal due to such factors as:

1. the nature of the access patterns to the data stores changing;
2. the service requirements of the access changing;
3. the number of data stores changing;
4. new data storage devices being added or subtracted; and
5. data storage devices failing or approaching failure.

In such cases, the data stores need to be redistributed among the data storage devices to match the new needs. Based on the above, a goal configuration such as the goal configuration system 26 can be determined by the control 28. The problem then becomes one of determining the migration plan for the migration 12 to the goal configuration system 26. The plan must meet the criteria that:

1. intermediate states do not violate capacity constraints (i.e., whenever a data store is moved, there has to be enough space on the target data storage device); and
2. the load placed by the move on the system should be minimized (in terms of data stores moved, time taken (parallel or sequential), bandwidth used, or similar metric).

The exemplary migration plan of FIG. 2 starts by determining the terminal moves possible by comparing the initial configuration System 22 with the goal configuration system 26. In this comparison, it becomes evident that store B which has a capacity of 2 cannot be moved from the device 1 to the device 2 because the device 2 has a capacity of 5 and the store C with a capacity of 2 plus the store D with a capacity of 2 and the store B with a capacity of 2 will equal a capacity of 6 which is greater than the device 2 capacity of 5. Similarly, the store D with a capacity of 2 cannot be moved immediately to the device 1 because the device 1 has a capacity of 6 and the store A with a capacity of 3 plus the store B with a capacity of 2 plus the store D with a capacity of 2 will result in a capacity of 7 which is greater than the device 1 capacity of 6. However, it is possible for the store E with a capacity of 1 to be moved in terminal move 30 to device 1 since the store A with a capacity of 3 plus the store B with a capacity of 2 and the store E with a capacity of 1 will be equal to the device 1 capacity of 6.

After establishing that no other terminal moves are possible after the store E move, a shunt move will be considered. This involves the move 32 of the store D with capacity 2 from the device 2 to the device 3 with a capacity of 2. This permits the store B with a capacity of 2 to make the move 34 from the device 1 to the device 2 with a capacity of 5 which only contains the store C with a capacity of 2. Finally, the store D with a capacity of 2 can make move 36 from the device 3 to the device 1.

Once the goal configuration system 26 is arrived at, the exemplary migration plan of FIG. 2 will be complete in four steps or moves. Similarly, an alternative migration plan would have been to move the store B from the device 1 to the device 3 and move the store D from the device 2 to the device 1 and then subsequently move the store D from the device 3 to the device 1. However, this would have the same number of steps and would probably not have any significant advantages.

In FIG. 4, the migration planner 116 of the migration plan generator 100 generates the complex migration plan 120 of the present invention. The initial configuration data 110 would contain the data on the set of data storage devices (e.g. devices 1 through 3), of the set of data stores (e.g. stores A through E) and the binding of the data stores to the data storage devices (e.g. device 1 with stores A and B; device 2 with stores C and D; and device 3 with store E).

The goal configuration data 112 would similarly contain the data on the set of data storage devices (e.g. devices 1 through 3), of the set of data stores (e.g. stores A through E), and of the binding of the data stores to the data storage devices (e.g. device 1 with stores A, D, and E; device 2 with store C and B; and device 3 with no stores). The set of constraints would be the capacities (e.g. device 1 with a capacity of 6, device 2 with a capacity of 5, and device 3 with a capacity of 3, store A with a capacity of 3, store B with a capacity of 2, store with a capacity of 2, and store E with a capacity of 1). The migration planner 116A shown in FIG. 5 starts at "start" 130 and goes to the "build" plan block 132. One arrangement of the migration planner 116A uses a "Simple" plan which embodies a family of simple heuristics to build a plan. Essentially, the heuristic is to make terminal moves until no terminal move can be made. Thus, the program would proceed from the "build plan" block 132 through the "out of time?" decision block 134, the "terminal move?" decision block 136, the "constraints met?" decision block 138, "select terminal move" block 140, "add move to plan" block 142 and then to the "goal configuration met?" decision block 144. If the goal configuration is not met, the migration plan goes back to the "build" plan block 132 to determine another terminal move. The migration planner 116 with a "Simple" plan will either fail to "fail" block 118 or generate the migration plan 120.

The choice of the sequence in which the possible terminal moves will be made can be determined randomly, by a preset ordering, or based on some function of the data store (such as the smallest data store first), etc. These plans are the alternatives in the "Random/Preset/Function Simple" plan 156 of FIG. 6. Each plan will result in a plan with the minimum possible number of moves since all data stores that need to move are moved directly to their terminal or goal configurations or will terminate the migration planner 116 without finding a plan when time runs out.

Since it is possible for the migration plan generator 100 to enter a state where there are no valid terminal moves, it is desirable that the migration planner 116 be able to perform shunts by migrating data stores to data storage devices that are not the terminal or goal positions. This is accomplished in a number of different ways as will hereinafter be described.

The migration plan heuristic must try to move towards the goal configuration while at the same time avoiding "bad" states that make further progress difficult or impossible. To that end, a "contention" metric that quantifies a "bad" state has been developed. The "contention" of a data storage device is defined as the total size of the data stores that need to be moved onto a data storage device (but currently reside elsewhere) divided by the amount of unused capacity on such data storage device. When the "terminal move?" decision block 136 cannot find valid terminal moves, a shunt is performed in the "select shunt" block 146. To select the data store to move in the shunt, the most contended and the least contended data storage devices are determined and the largest possible data store from the most contended data storage device is moved to the least contended data storage device. The Greedy shunt move is then added to the "add move to plan" block 142 and the program continues to seek terminal moves and performs shunts only when there are no valid terminal moves. This plan is also the "Greedy Simple" plan 158 of FIG. 6.

The contention of the entire data storage system, or global contention, is the sum of the contention over all the data storage devices. When selecting a move, the migration planner 116A will always select the move that leads to the lowest contention for the data storage system rather than the terminal moves. This plan is also the "Greedy" plan 160 in FIG. 6.

As another alternative, when no terminal moves can be made, there may be a cycle in the terminal move graph for the migration. For example, the terminal move graph 50 of FIG. 3 has a move 52 from device 1 to device 2 because a data store currently on device 1 belongs on device 2. Similarly, there is a move 54 from device 2 to device 1 because a data store currently on device 2 belongs on device 1. The terminal move graph 50 can have no data storage devices with moves coming in but none going out. Explicitly, if there is a data storage device that has terminal moves going into it but none going out, then all these terminal moves will be valid, since the data storage device can clearly accommodate all the data stores in the goal configuration.

In the "select shunt" block 146 of FIG. 5, the "Cycle" plan finds shunts by first trying to find cycles with small data stores. It does this Greedily, namely, by finding the smallest data store to be moved on one data storage device and then finding the smallest data store to be moved off the second data storage device. Once this cycle is determined, the largest data store in this cycle is shunted to any data storage device that can accommodate it. This will definitely allow at least one terminal move in the cycle to proceed. When picking terminal moves, the terminal move of the smallest possible data store (out of all valid terminal moves) is selected based on any of the above described criteria for a "Simple" plan. This plan is also the "Cycle" plan 162 of FIG. 6.

In the migration planner 116B of FIG. 6, the program begins at "start" block 150 and moves to select a plan in "select plan" block 152. The "select plan" block receives the initial configuration data 110, the goal configuration data 112, and the set of constraints 114. From the "select plan" block 152 the program goes to the "out of time?" decision block 154 to determine if the plan has been running too longhand if so, to exit to the "fail" block 118. The "Random/Preset/Functional Simple" plan 156, the "Greedy Simple" plan 158, the "Greedy" plan 160, and the "Cycle" plan 162 have previously been described.

Another plan which could be selected is the "Hillclimbing" plan 164 which uses the global contention metric. At each step the move that minimizes the global contention metric is selected. The migration proceeds directly towards the closest local minimum for the contention metric. Where a local minimum is reached in which no move reduces the contention metric and the goal configuration has not been attained, the migration planner 116B will time out and exit to the "fail" block 118.

The main drawback of the "Hillclimbing" plan 164 is that it gets stuck easily in local minima, but there are a number of approaches to circumvent this problem, such as backtracking from the local minimum or performing a random perturbation.

Another plan is the "Simulated Annealing" plan 166 which is a probabilistic Hillclimbing approach that will sometimes choose moves that do not improve the optimization metric, thus allowing the opportunity to get out of local minima. The "Simulated Annealing" planner 166 also uses a contention metric (a slightly different one –) as the energy function to minimize. The contention metric is the sum of log(1+InSetSize(D)/Free(D)) over all data storage devices D where InSetSize (D)=sum (capacity (S)) for all stores that are not currently placed on a storage device, D, that reside on the device in the final configuration. It uses a very simple cooling schedule: the temperature is reduced by a constant ratio every M transitions where M is a numerical trade off between the length of the algorithm and the search space examined for any or a limited number of good plans. The migration will terminate when it reaches the user's set cut-off time or when it finds the goal state.

The "Simulated Annealing" plan is well suited to finding an optimal or near optimal configuration rather than finding a short path towards a given global optimum. Thus, an alternative would be to base the optimums on migration plans (i.e. sequences of moves) rather than configurations. The "energy" of a migration plan would be its cost (in terms of length). Even migration plans that violate the set of constraints and/or did not reach the goal configuration would be permitted with appropriate penalties added to the energy.

Based on the above, it would be apparent to those skilled in the art that there are a number of other programs, designated as "Other" plans 168, which could be used to generate migration plans. One such "Other" program 168 involves genetic programming on a population of candidate plans. The fitness criterion depends on how long a plan is, whether it violates constraints, and whether it reaches the goal configuration. As an overall approach, the genetic programming is better than the "Simulated Annealing" plan 166 since plans are easily represented as strings or discrete sequences of moves, which is in keeping with genetic algorithm program formulation.

Another "Other" program 168 uses the algorithms and heuristics from graph theory. A "sufficiency" graph is built. Since the goal configuration is a legal one, each data store is either in its final destination, has a valid terminal move to its final destination, or has a dependency on (a move to) some other data store. If there are no valid terminal moves, the sufficiency graph has no data stores with moves in but not out, which means it is either empty or contains a cycle. If the graph is empty, then the program fails, however if there are cycles, graph theory is applied to find the best place to break the cycle(s), i.e., the shunt that would do the most good. This approach is different from the "Cycle" plan 162, which finds cycles with no guarantee that breaking the cycle will enable all the other data stores in the cycle to move to their goal configuration.

An example of the above graph-theoretical approach encodes the data stores as nodes and dependencies (such as "store B needs to move from device 1 before store A moves onto it") as moves for "edges". However, this results in a hypergraph, with edges from sets of data stores to sets of data stores such as, "store A and store B and store E could move to device 1 if store C and store D moved off of it". Some information is lost by building a sufficiency graph which indicates that there is an edge from store A to store B if it is sufficient that store B move off device 1 for store A to be moved to device 2.

The "Meta" plan 170 in the migration planner 116B of FIG. 6 switches from one plan to another while generating a plan based on some predetermined factor (e.g. the plan's performance so far). This "Meta" plan 170 is used when there are several plans which work well in some cases and badly on others. The various plans could then be run either concurrently, switching back and forth from one to another, or in parallel, using the shortest resulting plan. For example, the "Hillclimbing" plan 164 would be used until it got stuck, then the "Simulated Annealing" plan 166 would be used for awhile, and then the migration planner 116B would return to the "Hillclimbing" plan 164.

Using one or a plurality of the plans described above, the migration planner 116B will either fail to produce a migration plan at "fail" block 118 or will produce the migration plan 120. The migration plan 120 is used by the control 28 to automatically optimize data storage configurations and change data storage configurations during data system operation.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A data storage system comprising:
    a plurality of data storage devices;
    a plurality of data stores, each of said plurality of data stores capable of binding to one of said plurality of data storage devices;
    a control connected to said plurality of data storage devices for moving one of said plurality of data stores among said plurality of storage devices from an initial configuration to a goal configuration; and
    a migration plan generator connected to said control and responsive to said initial configuration and said goal configuration to provide a migration plan to cause said control to move said one of said plurality of data stores from said initial configuration to said goal configuration, said migration plan generator includes:
        a migration planner for providing a migration plan for moving said one of said plurality of data stores from a first of said plurality of data storage devices in said initial configuration to a second of said plurality of data storage devices to said goal configuration in a first terminal move and
        said migration planner for providing said migration plan for moving said first of said plurality of said data stores from said first of said plurality of data storage devices to an intermediate data storage device in said plurality of data storage devices in a shunt move when no terminal moves are possible whereby said first of said plurality of data stores is moved to one of said plurality of data storage devices which is not part of the goal configuration before moving to said second of said plurality of data storage devices to said goal configuration.

2. The data storage system as claimed in claim 1 wherein:
    said migration planner is capable of providing said migration plan in which said shunt move is a plan selected from a group consisting of Greedy, Cycle, Hillclimbing, Simulated Annealing, and a combination thereof.

3. The data storage system as claimed in claim 1 including:
    a data storage network connected to said plurality of data storage devices; and
    a plurality of hosts connected to said data storage network.

4. The data storage system as claimed in claim 1 wherein:
    said migration planner capable of providing said migration tion plan for moving at least one of said plurality of data stores to and from said plurality of data storage devices is a plan selected from a group consisting of Simple, Greedy Simple, Greedy, Cycle, Hillclimbing, Simulated Annealing, Other, and a combination thereof.

5. A data storage system comprising:

a plurality of data storage devices having constraints;

a plurality of data stores having constraints, each of said plurality of data stores capable of binding to one of said plurality of data storage devices when the constraints of said plurality of data storage devices are met;

a control connected to said data storage devices for moving said plurality of data stores among said plurality of data storage devices from an initial configuration to a goal configuration while meeting the constraints of each of said plurality of data storage devices;

a migration plan generator connected to said control responsive to said initial configuration and said goal configuration to provide a heuristic migration plan to cause said control to move said plurality of data stores from said initial configuration data storage devices to said goal configuration data storage devices, said migration plan generator includes:

a migration planner capable of providing a migration plan for moving said plurality of data stores among said plurality of data storage devices in terminal moves selected from a group consisting of Random Selection, Preset Ordering, a Function of each of said plurality of data stores, and a combination thereof until no terminal move can be made when a shunt move will be made which leads to the lowest contention for said plurality of data storage devices.

6. The data storage system as claimed in claim 5 wherein:

said migration planner capable of providing said migration plan for moving said plurality of data stores among said plurality of data storage devices in terminal moves until no terminal move can be made when a shunt move will be made that leads to the lowest contention for the sum of said plurality of data storage devices, and then said migration plan continues to make terminal moves.

7. The data storage system as claimed in claim 5 wherein:

said migration planner capable of providing a migration plan for moving said plurality of data stores among said plurality of data storage devices in terminal moves until no terminal move can be made when a shunt move is found by finding cycles with small stores Greedily and then shunting the largest data store in the cycle to any of said plurality of data storage devices for which the constraints can be met.

8. The data storage system as claimed in claim 5 wherein:

said migration planner capable of providing a migration plan for moving said plurality of data stores among said plurality of data storage devices in selected moves that minimize the global contention of the sum of said plurality of data storage devices.

9. The data storage system as claimed in claim 5 wherein:

said migration planner capable of providing a migration plan for moving said plurality of data stores among said plurality of data storage devices in selected moves based on Simulated Annealing using a contention metric as an energy function.

10. The data storage system as claimed in claim 5 wherein:

said migration plan generator includes a migration planner capable of providing a migration plan for moving said plurality of data stores among said plurality of data storage devices in selected moves while switching from plans selected from a group consisting of Simple, Greedy Simple, Greedy, Cycle, Hillclimbing, Simulated Annealing, Other, and a Meta plan.

11. The data storage system as claimed in claim 5 including:

a data storage network connected to said plurality of data storage devices; and a plurality of hosts connected to said data storage network.

12. The data storage system as claimed in claim 5 wherein:

said migration plan generator includes a migration planner capable of providing a migration plan for moving said plurality of data stores among said plurality of data storage devices in moves which use the lowest energy plan where the sequence of said moves is proportional to the energy of said plan.

13. The data storage system as claimed in claim 5 wherein:

said migration plan generator includes a migration planner capable of providing a migration plan for moving said plurality of data stores among said plurality of data storage devices in moves which use genetic programming on a population of said plans from a group consisting of Greedy, Cycle, Hillclimbing, and Simulated Annealing plans to determine the migration plan.

14. The data storage system as claimed in claim 5 wherein:

said migration plan generator includes a migration planner capable of providing a migration plan for moving said plurality of data stores among said plurality of data storage devices in moves which use a graph-theoretical heuristic to determine the moves.

15. The data storage system as claimed in claim 5 wherein:

said migration plan generator includes a migration planner capable of providing a migration plan for moving said plurality of data stores among said plurality of data storage devices in moves which will be designated as a "fail" when a migration plan is not generated within a predetermined period of time.

16. The data storage system as claimed in claim 5 wherein:

said plurality of data storage devices have constraints selected from a group consisting of capacity, bandwidth, movement rate, and a combination thereof; and said plurality of data stores has capacity constraints.

17. The data storage system as claimed in claim 3 wherein:

said migration planner uses information to provide the migration plan selected from a group consisting of:

access patterns to said data storage devices changing;

service requirements of the access changing;

number of said data stores changing;

new data storage devices being added or subtracted; and said data storage devices failing or approaching failure.

18. The data storage system as claimed in claim 3 wherein:

said migration planner uses information to provide the migration plan selected from a group consisting of:

capacity constraints of said intermediate data storage device; and minimizing migration load on the data storage system.

19. The data storage system as claimed in claim 5 wherein:
said migration planner uses information to provide the migration plan selected from a group consisting of:
access patterns to said data storage devices changing;
service requirements of the access changing;
number of said data stores changing;
new data storage devices being added or subtracted; and
said data storage devices failing or approaching failure.

20. The data storage system as claimed in claim 5 wherein:
said migration planner uses information to provide the migration plan selected from a group consisting of:
capacity constraints of said intermediate data storage device; and
minimizing migration load on the data storage system.

21. A data storage system comprising:
first, second, and third data storage devices;
a data store for binding to the first, second, and third data storage devices;
a control connected to said first, second, and third data storage devices for moving the data store among said storage devices from an initial configuration to a goal configuration; and
a migration plan generator connected to said control and responsive to said initial configuration and said goal configuration to provide a migration plan to cause said control to move said data store from said initial configuration to said goal configuration, said migration plan generator including:
a migration planner for providing a migration plan for moving said data store from said first data storage device in said initial configuration to said third data storage device to said goal configuration in a first terminal move and
a migration planner for providing a migration plan for moving said data store from said first data storage device in said initial configuration to said second data storage in a shunt move when the first terminal move is not possible before moving said data store to said third data storage device to said goal configuration in a second terminal move.

22. A data storage system comprising:
first, second, and third data storage devices having predetermined constraints;
a data store for binding to the first, second, and third data storage devices when the predetermined constraints are met;
a control connected to said first, second, and third data storage devices for moving the data store among said storage devices from an initial configuration to a goal configuration; and
a migration plan generator connected to said control and responsive to said initial configuration and said goal configuration to provide a heuristic migration plan to cause said control to move said data store from said initial configuration to said goal configuration, said migration plan generator including:
a migration planner for providing a migration plan for moving said data store from said first data storage device in said initial configuration to said third data storage device to said goal configuration in a first terminal move in an order based on an order selected from a group consisting of Random Selection, Preset Ordering, a Function of each of said plurality of data stores and
a migration planner for providing a migration plan for moving said data store from said first data storage device in said initial configuration to said second data storage in a shunt move which leads to the lowest contention for said plurality of data storage devices when the first terminal move is not possible before moving said data store to said third data storage device to said goal configuration in a second terminal move.

* * * * *